United States Patent [19]

Yamashita et al.

[11] Patent Number: 5,952,096
[45] Date of Patent: Sep. 14, 1999

[54] SPECTACLE LENS

[75] Inventors: Hironori Yamashita; Tsuneo Shimada, both of Tokyo, Japan

[73] Assignee: Teijin Chemicals, Ltd., Tokyo, Japan

[21] Appl. No.: 08/788,101

[22] Filed: Jan. 23, 1997

[30] Foreign Application Priority Data

Jan. 26, 1996 [JP] Japan ................................... 8-011671
Feb. 27, 1996 [JP] Japan ................................... 8-039554

[51] Int. Cl.$^6$ .............................. B32B 5/16; B32S 27/36
[52] U.S. Cl. ......................... 428/332; 428/334; 428/412; 524/84; 264/176.1; 264/171; 264/331.21
[58] Field of Search ..................................... 428/332, 334, 428/412; 524/84; 264/176.1, 171, 331.21

[56] References Cited

U.S. PATENT DOCUMENTS

| | | | |
|---|---|---|---|
| 4,576,870 | 3/1986 | Liebler et al. | 428/515 |
| 4,812,498 | 3/1989 | Nakahara | 524/91 |
| 5,108,835 | 4/1992 | Hahnsen | 428/334 |

FOREIGN PATENT DOCUMENTS

| | | |
|---|---|---|
| 62-146951 | 6/1987 | Japan . |
| 4292661 | 10/1992 | Japan . |
| 635141 | 5/1994 | Japan . |
| 641162 | 6/1994 | Japan . |
| 792301 | 4/1995 | Japan . |

*Primary Examiner*—Leszek Kiliman
*Attorney, Agent, or Firm*—Sherman and Shalloway

[57] ABSTRACT

A spectacle lens formed from a resin composition which consists essentially of (1) 100 parts by weight of a polycarbonate resin; (2) 0.05 to 0.5 part by weight of an ultraviolet absorber (A) having a maximum absorption in a wavelenght of 300 to 345 nm when measured in a chloroform solution; and (3) 0.01 to 0.3 part by weight of an ultraviolet absorber (B) having a maximum absorption in a wavelenght of 346 to 400 nm when measured in a chloroform solution. The spectacle lens has excellent impact resistance and transparency and high absorbing power for ultraviolet light having a specific wavelength.

36 Claims, No Drawings

SPECTACLE LENS

FIELD OF THE INVENTION

This invention relates to a spectacle lens which has excellent impact resistance and transparency and high ultraviolet light absorbing power, particularly absorbing power for ultraviolet light having a specific wavelength. More specifically, it relates to a spectacle lens which comprises a polycarbonate resin as a resin component, almost free from yellowing, and has excellent workability.

PRIOR ART

A polycarbonate resin has excellent characteristic properties such as high refractive index, transparency and impact resistance and has been recently attracting much attention as a material for a lens, particularly as a material for a spectacle lens. Since a spectacle lens formed from a polycarbonate resin is thinner, lighter and has much higher impact strength than the conventional glass lenses and plastic lenses manufactured by casting polymerization (to be referred to as "cast lenses" hereinafter) it is safe and exhibits high functionality. Therefore, it has been and is used as an accommodation lens, sunglasses, protective glasses and the like.

In recent years, there has arisen strong demand for the protection of eyes from harmful ultraviolet light by providing ultraviolet light absorbing power to a spectacle lens. For instance, cast lenses and glass lenses are covered with a coating layer having ultraviolet light absorbing power on the surface to meet the demand. However, the lenses produced by this coating method has drawback in high prices and slight yellowing of a lens itself. In the preparation of a cast lens by polymerization, addition of an ultraviolet absorber can be made during polymerization. However, this method also has such defects as the deterioration of polymerizability and noticeable yellowing of a lens itself.

In contrast to the above, in the case of a spectacle lens formed from a polycarbonate resin, a polycarbonate resin itself has ultraviolet light absorbing power and moreover, since a polycarbonate resin is thermoplastic, it can contain a desired ultraviolet absorber easily when the ultraviolet absorber is blended at the time of melt-molding. Therefore, an absorber for ultraviolet light having a long wavelength can be blended into a polycarbonate resin. However, a conventional polycarbonate resin can absorb ultraviolet light having a wavelength of up to 375 nm at the utmost. To absorb ultraviolet light having a longer wavelength exceeding 375 nm, the amount of an ultraviolet absorber to be added must be increased to 2 to 10 times that for a normal case. Since an ultraviolet absorber has generally a sublimation property, when a large amount of the ultraviolet absorber is added, a mirror-surface mold is stained by the sublimation of the ultraviolet absorber in injection-molding of a polycarbonate resin, thereby greatly deteriorating the outer appearance of the resulting lens.

Japanese Patent Publication Nos. Hei 6-35141 and Hei 6-41162 disclose a method for forming a surface layer for a multi-layer laminate sheet or film at the time of extrusion molding by adding 0.1 to 20 parts by weight of an oligomer-type ultraviolet absorber which hardly sublimes into a polycarbonate resin. However, the object of this method is to provide the sheet or film with weatherbility, and is not optical. Further, although there is a type of ultraviolet absorber which has power of absorbing ultraviolet light having a long wavelength, it is necessary to add a large amount of a bluing agent to erase a yellow tint, because a polycarbonate resin yellows considerably when this type of ultraviolet absorber for absorbing a long wavelength is added. However, this method can provide only a hazy lens whose transparency is impaired and luminous transmittance is deteriorated due to addition of a large amount of the bluing agent. Further, Japanese Laid-open Patent Application No. Hei 7-92301 proposes a plastic lens for inhibiting the transmission of ultraviolet light and near infrared light by adding an ultraviolet absorber and an infrared absorber. However, a lens obtained by this method has unsatisfactory transparency. It has been presumed, therefore, that in a spectacle lens formed from a polycarbonate resin, complete absorption of ultraviolet light having a wavelength of 380 nm or less and high transparency conflict with each other.

Japanese Laid-open Patent Application No. Sho 62-146951 teaches a polycarbonate resin composition which contains 0.001 to 5 parts by weight of an alkylidenebis (benzotriazolylphenol) compound represented by a specific structural formula based on 100 parts by weight of a polycarbonate resin to improve optical resistance. This publication shows the measurement result of a change in the yellowness index ($\Delta YI$) of a test piece prepared by adding 0.3% by weight of each of five different specific compounds to a polycarbonate resin when it was irradiated with ultraviolet light from a high-pressure mercury lamp. The results merely show that the change in the yellowness index was reduced by adding the above specific compounds.

Further, Japanese Laid-open Patent Application No. Hei 4-292661 teaches a resin composition containing an ultraviolet absorber which has a maximum absorption in a wavelength of 280 to 360 nm and does not absorb a wavelength of 400 nm in an amount of 0.01 to 0.15 part by weight based on 100 parts by weight of a transparent thermoplastic resin containing a polycarbonate resin. This resin composition has been developed as a camera lens having a transmittance of light having a wavelength of 400 nm of 80 % or more because a silver salt film has a sensitivity peak at a wavelength of 400 nm.

SUMMARY OF THE INVENTION

A first object of the present invention is to provide a spectacle lens formed from a polycarbonate resin which has excellent impact resistance and transparency and can cut ultraviolet light having a specific wavelength almost completely.

A second object of the present invention is to provide a spectacle lens formed from a composition which is hardly yellowed by ultraviolet light and is free from the contamination of the mirror surface of a mold by the sublimation of an ultraviolet absorber during molding.

A third object of the present invention is to provide a spectacle lens which does not transmit a wavelength of 380 nm substantially and has high luminous transmittance.

To attain the above objects, the inventors of the present invention have conducted intensive studies on an ultraviolet absorber for use in a polycarbonate resin and have found that, when two different ultraviolet absorbers, each having a maximum absorption at a specific wavelength are combined and used in specific amounts and a specific ratio, ultraviolet light having a wavelength of 380 nm can be completely absorbed without deteriorating moldability and impairing the transparency of a lens. The present invention has been achieved upon this finding.

Thus, according to the present invention, there is provided a spectacle lens formed from a resin composition which essentially consists of:

(1) 100 parts by weight of a polycarbonate resin;

(2) 0.05 to 0.5 part by weight of an ultraviolet absorber (A) having a maximum absorption in a wavelength of 300 to 345 nm when measured in a chloroform solution; and (3) 0.01 to 0.3 part by weight of an ultraviolet absorber (B) having a maximum absorption in a wavelength of 346 to 400 nm when measured in a chloroform solution.

In the resin composition forming the spectacle lens of the present invention, the two different ultraviolet absorbers (A) and (B) are combined in the above-described amounts. Further, the weight ratio of the ultraviolet absorber (B) to the ultraviolet absorber (A) is advantageously in the range of 0.05 to 4.

The spectacle lens of the present invention will be described in detail hereinunder.

The polycarbonate resin used in the present invention is an aromatic polycarbonate resin obtained by reacting a divalent phenol and a carbonate precursor. A typical example of the divalent phenol is 2,2-bis(4-hydroxyphenyl) propane (generally called bisphenol A), but the divalent phenol may be other divalent phenol. Illustrative examples of the divalent phenol include bis(hydroxyaryl)alkanes such as bisphenol A, bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxyphenyl) phenylmethane, 2,2-bis(4-hydroxy-3-methylphenyl) propane, 1,1-bis(4-hydroxy-3-tert-butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane; bis(hydroxyphenyl) cycloalkanes such as 1,1-bis(hydroxyphenyl)cyclopentane and 1,1-bis(hydroxyphenyl)cyclohexane; dihydroxyaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; and the like. They may be used alone or in combination of two or more.

Of the above divalent phenols, 2,2-bis(4-hydroxyphenyl) propane (bisphenol A) is preferably used as a divalent phenol component. Particularly preferably, 70 mol % or more, particularly 80 mol % or more, of the whole divalent phenol component consists of bisphenol A. The most preferable aromatic polycarbonate resin is obtained from a divalent phenol component substantially comprising bisphenol A.

Basic means for producing a polycarbonate resin is briefly described hereinunder. In a solution method which uses phosgene as a polycarbonate precursor, a reaction between a divalent phenol component and phosgene is generally carried out in the presence of an acid binder and an organic solvent. As the acid binder is used an alkali metal hydroxide such as sodium hydroxide or potassium hydroxide, or an amine compound such as pyridine. As the organic solvent is used a hydrocarbon halide such as methylene chloride or chlorobenzene. For the acceleration of the reaction, a catalyst such as tertiary amine or quaternary ammonium salt may be used, and a terminator such as a phenol or a alkyl-substituted phenol exemplified by p-tert-butyl phenol is preferably used as a molecular weight modifier. The reaction temperature is generally 0 to 40° C., the reaction time is several minutes to 5 hours, and pH during reaction is preferably maintained at 10 or more.

In an ester exchange method (melting method) using diester carbonate as a carbonate precursor, a divalent phenol component and diester carbonate are stirred, under heating, in a predetermined ratio in the presence of an inert gas and the resulting alcohol or phenol is distilled off. The reaction temperature differs depending on the boiling point of the produced alcohol or phenol but is generally 120 to 300° C. The reaction can be carried out at a reduced pressure from the beginning while the produced alcohol or phenol is distilled off. To accelerate the reaction, an ordinary ester exchange reaction catalyst may be used. Illustrative examples of the diester carbonate used for this ester exchange reaction include diphenyl carbonate, dinaphthyl carbonate, dimethyl carbonate, diethyl carbonate, dibutyl carbonate and the like, of which diphenyl carbonate is particularly preferred.

The molecular weight of the polycarbonate resin used in the present invention is preferably 17,000 to 30,000, particularly preferably 20,000 to 26,000, in terms of viscosity-average molecular weight. A spectacle lens is a precision molding and it is important to transfer a mirror surface of a mold accurately so as to provide a prescribed curvature and a prescribed diopter. Accordingly, a low-viscosity resin having high melt flowability is desired. However, if the viscosity is too low, impact strength which is the characteristic property of a polycarbonate resin cannot be retained. Here, the viscosity-average molecular weight (M) is obtained from the following Schnell's viscosity formula:

$$[\eta]=1.23\times10^{-4}M^{0.83}$$

based on the intrinsic viscosity $[\eta]$ of a solution measured at 20° C. in methylene chloride as a solvent, using an Ostwald viscometer.

The resin composition of the present invention comprises two kinds of ultraviolet absorbers which differ from each other in wavelength absorption characteristics in the polycarbonate resin. One of the absorbers is an ultraviolet absorber (A) having a maximum absorption in a wavelength range of 300 to 345 nm and the other is an ultraviolet absorber (B) having a maximum absorption in a wavelength range of 346 to 400 nm. The absorption maximums of these two ultraviolet absorbers are absorption spectra measured in a chloroform solution at a concentration of 10 mg/lit. using a 10 mm-thick quartz cell.

When each of the two ultraviolet absorbers is used alone, absorption of ultraviolet light having a wavelength of 380 nm is insufficient. Or when either absorber is added in an amount large enough to absorb the wavelength of 380 nm, the ultraviolet absorber sublimes during molding, thereby increasing the haze of the produced lens or reducing the hue of the lens.

According to the present invention, by using a combination of the above specific two ultraviolet absorbers (A) and (B), ultraviolet light having a wavelength of 380 nm can be almost completely absorbed and the luminous transmittance of 87% or more is maintained and the resulting lens has a good hue even though the amount of each of the absorbers is small. In addition, the present invention has such an advantage that the chance of yellowing with ultraviolet light is extremely small.

The ultraviolet absorber (A) has a maximum absorption in a wavelength of 300 to 345 nm and is selected from benzophenone-based ultraviolet absorbers typified by 2-hydroxy-4-methoxybenzophenone, 2-hydroxy-4-n-octoxybenzophenone, 2-hydroxy-4-methoxy-2'-carboxybenzophenone and 2,4-dihydroxybenzophenone; and benzotriazole-based ultraviolet absorbers typified by 2-(2'-hydroxy-5'-methylphenyl)benzotriazole, 2-[2-hydroxy-3-(3,4,5,6-tetrahydrophthalimidemethyl)

-5-methylphenyl]benzotriazole, 2-(2-hydroxy-3,5-di-tert-butylphenyl)benzotriazole and 2-(2'-hydroxy-5'-tert-octylphenyl)benzotriazole. They may be used alone or in combination of two or more.

Of the above ultraviolet absorbers (A), benzotriazole-based ultraviolet absorbers are preferred, of which 2-(2'-hydroxy-5'-methylphenyl)benzotriazole and 2-(2'-hydroxy-5'-tert-octylphenyl)benzotriazole are particularly preferred.

The ultraviolet absorber (A) is contained in an amount of 0.05 to 0.5 part by weight based on 100 parts by weight of a polycarbonate resin. If the amount is less than 0.05 part by weight, ultraviolet absorption power will be insufficient, while if it is more than 0.5 part by weight, ultraviolet absorption power will not be improved any longer, and on the contrary, sublimation during molding occurs, the haze of the resulting lens increases and the hue of the lens deteriorates greatly. The particularly preferable amount is 0.1 to 0.35 part by weight.

The ultraviolet absorber (B) having a maximum absorption in a wavelength of 346 to 400 nm, which is used in combination with the ultraviolet absorber (A) is selected from benzophenone-based ultraviolet absorbers typified by 2,2'-dihydroxy-4-methoxybenzophenone; and benzotriazole-based ultraviolet absorbers typified by 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2,2'-methylenebis[4-(1,1,3,3,-tetramethylbutyl)-6-(2H-benzotriazole-2-yl)phenol], 2-[2-hydroxy-3,5-bis($\alpha,\alpha$-dimethylbenzyl)phenyl]-2H-benzotriazole and 2-(3,5,-di-tert-amyl-2-hydroxyphenyl)benzotriazole. They may be used alone or in combination of two or more.

Of the above ultraviolet absorbers (B), benzotriazole-based ultraviolet absorbers are preferred, of which 2-(3-tert-butyl-5-methyl-2-hydroxyphenyl)-5-chlorobenzotriazole, 2,2'-methylenebis[4-(1,1,3,3,-tetramethylbutyl)-6-(2H-benzotriazole-2-yl)phenol] and 2-[2-hydroxy-3,5-bis($\alpha,\alpha$-dimethylbenzyl)phenyl]-2H-benzotriazole are particularly preferred.

The ultraviolet absorber (B) is contained in an amount of 0.01 to 0.3 part by weight based on 100 parts by weight of the polycarbonate resin. If the amount is less than 0.01 part by weight, ultraviolet absorption power will be insufficient, while if it is more than 0.3 part by weight, the hue may considerably deteriorate depending on the ultraviolet absorber (B), resulting in a hazy lens. The amount is more preferably 0.015 to 0.27 part by weight, particularly preferably 0.02 to 0.25 part by weight.

It is desired that the blending ratio (weight) R of the ultraviolet absorber (B) to the ultraviolet absorber (A) represented by the equation R=(B)/(A) should be set to 0.05 to 4.

If the blending ratio R is below 0.05, ultraviolet absorption power will be insufficient, while if the blending ratio is above 4, the hue will considerably deteriorate, thereby making the produced lens unsuitable for practical use. The blending ratio is particularly preferably 0.06 to 3.

The blending timing and blending method of the ultraviolet absorber (A) and the ultraviolet absorber (B) are not particularly limited. As for the blending timing, they may be added during or after the polymerization of the polycarbonate resin. As for the blending method, they may be mixed with the polycarbonate resin in the form of a powder, pellet or bead by an arbitrary mixer such as a tumbler, ribbon blender, high-speed mixer or the like and then, subjected to melt kneading. The ultraviolet absorber (A) and the ultraviolet absorber (B) may be added simultaneously or in a desired order.

The polycarbonate resin composition of the present invention may contain a mold-release agent so as to obtain a favorable result. As the mold-release agent is generally used a saturated aliphatic acid ester exemplified by monoglycerides such as monoglyceride stearate; lower aliphatic acid esters such as stearic acid stearate; higher aliphatic acid esters such as sebacic acid behenate; erythritol esters such as pentaerythritol tetrastearate; and the like. The mold-release agent is used in an amount of 0.03 to 1 part by weight based on 100 parts by weight of the polycarbonate resin. A phosphorous acid ester-based thermal stabilizer may be used in an amount of 0.001 to 0.1 part by weight based on 100 parts by weight of the polycarbonate resin as required. Preferred examples of the phosphorous acid ester-based thermal stabilizer include tris(nonylphenyl)phosphite, triphenyl phosphite, tris(2,4-di-tert-butylphenyl)phosphite, tetrakis(2,4-di-tert-butylphenyl)-4,4'-biphenylene diphosphonite, bis(2,6-di-tert-butyl-4-methylphenyl) pentaerythritol-di-phosphite, bis(2,4-di-tert-butylphenyl) pentaerythritol-di-phosphite, tris(ethylphenyl)phosphite, tris(butylphenyl)phosphite, tris(hydroxyphenyl)phosphite and the like. Of these, particularly preferred are tris(nonylphenyl)phosphite and tetrakis(2,4-di-tert-butylphenyl)-4,4'-biphenylene diphosphonite.

A bluing agent may be contained in the polycarbonate resin composition of the present invention to erase a yellow tint of a lens due to the polycarbonate resin or ultraviolet absorbers, when the polycarbonate resin composition is molded into a spectacle lens. Any bluing agent may be used without a problem as far as it can be used for a polycarbonate resin. An anthraquinone-based dye is generally preferred because it is easily available.

Specific examples of the bluing agent include: color index (C.A.) No. 60725 [general name: Solvent Violet 13; trade name: "Macrolex Violet B" of Bayer AG., "Dia Resin Blue G" of Mitsubishi Chemical MKV Co., Ltd., "Sumiplast Violet B" of Sumitomo Chemical Co., Ltd.]; C.A. No. 68210 [general name: Solvent Violet 31; trade name: "Dia Resin Violet D" of Mitsubishi Chemical MKV Co., Ltd.]; C.A. No. 60725 [general name: Solvent Violet 33; trade name: "Dia Resin Blue-J" of Mitsubishi Chemical MKV Co., Ltd.]; C.A. No. 61500 [general name: Solvent Blue 94, trade name: "Dia Resin Blue-N" of Mitsubishi Chemical MKV Co., Ltd.]; C.A. No.68210 [general name: Solvent Violet 36; trade name: "Macrolex Violet 3R" of Bayer AG.], General name: Solvent Blue 97 [trade name: "Macrolex Blue RR" of Bayer AG.]; and C.A. No.61110 [general name: Solvent Blue 45; trade name: "Tetrazole Blue RLS" of Sandoz AG]. The bluing agent is blended into the polycarbonate resin in an amount of 0.3 to 1.2 ppm. If a large amount of the bluing agent is blended, the absorption of the bluing agent will be too strong and consequently, luminous transmittance will decrease, resulting in a hazy lens. Particularly, an accommodation spectacle lens has a thin portion and a thick portion and there is a big difference in thickness between these portions. Accordingly, the absorption of the bluing agent is strong, a hue difference will be produced between central and peripheral portions of the lens owing to the difference of the thickness, thereby greatly deteriorating the outer appearance of the lens.

A spectacle lens formed from the polycarbonate resin composition of the present invention has extremely excellent transparency, and a luminous transmittance of 87% or more, preferably 88% or more when the thickness of the lens is 1.5 mm. Here, the luminous transmittance refers to a value measured under conditions to be described hereinafter and for a lens formed from the composition of the present invention which comprises a polycarbonate resin, ultraviolet absorbers (A) and (B), phosphorus-based stabilizer, mold-release agent and bluing agent. In the case where it is used as a sunglass lens or polarization lens which further comprises a dye or pigment, the luminous transmittance is a value obtained on the assumption that the dye or pigment is not contained.

The spectacle lens of the present invention has high transparency and a low yellowness index (YI). The yellowness index of the lens is set at 0.7 to 1.8, preferably 1 to 1.6 when the thickness of the lens is 5 mm. If the yellowness index is below 0.7, transmitted light is bluish when the resin composition is formed into a lens, while if the yellowness index is above 1.8, the transmitted light is yellowish.

Since the polycarbonate spectacle lens has a high refractive index and high impact resistance, attempts have been made to reduce the thickness and weight of the lens and a concave lens generally has a central thickness as extremely thin as about 1.5 mm. Therefore, the ultraviolet light transmittance of a 1.5 mm-thick central portion of a lens is extremely important from the standpoint of protecting eyes. In the case of a spectacle lens such as a sunglass lens or protective lens, a polycarbonate molding material which is colored in advance may be used, and even in this case, the spectacle lens of the present invention is extremely effective because it has a great ultraviolet light absorption effect and high transparency.

Since the spectacle lens of the present invention uses a polycarbonate resin as a substrate, it has high impact strength and a high refractive index and is excellent in ultraviolet light absorption effect, particularly in the effect of absorbing harmful ultraviolet light having a wavelength of 380 to 400 nm.

Thus, the present invention makes it possible to provide two different types of spectacle lenses according to application and purpose: one placing stress on luminous transmittance and the other placing stress on ultraviolet light absorption power. In other words, in applications where great importance is attached to luminous transmittance, it is preferred that the amount of the ultraviolet absorber (A) used be selected from the range of 0.1 to 0.5 part by weight and that of the ultraviolet absorber (B) from the range of 0.01 to 0.1 part by weight based on 100 parts by weight of the polycarbonate resin and the blending weight ratio R of the ultraviolet absorber (B) to the ultraviolet absorber (A) be selected from the range of 0.05 to 0.5 so as to achieve a spectral transmittance for a wavelength of 380 nm of 0.005% or less and a luminous transmittance of 88% or more when the thickness of the lens is 1.5 mm and a yellowness index (YI) of 0.7 to 1.8 when the thickness is 5.0 mm. In this case, the spectral transmittance for a wavelength of 400 nm can be 70% or less, preferably 60% or less.

In applications where great importance is attached to ultraviolet light absorption power, it is preferred that the amount of the ultraviolet absorber (A) used be selected from the range of 0.05 to 0.5 part by weight and that of the ultraviolet absorber (B) from the range of 0.05 to 0.3 part by weight based on 100 parts by weight of the polycarbonate resin and the blending weight ratio R of the ultraviolet absorber (B) to the ultraviolet absorber (A) should be selected from the range of 0.5 to 4 so as to achieve a spectral transmittance for a wavelength of 400 nm of 10% or less and a luminous transmittance of 87% or more when the thickness of the lens is 1.5 mm and a yellowness index (YI) of 0.7 to 1.8 when the thickness is 5.0 mm. In this case, the spectral transmittance for a wavelength of 380 nm can be 0.005% or less.

Researches conducted by the inventors have revealed that, when an ultraviolet absorber which belongs to the ultraviolet absorber (B) and has a special structure having two benzotriazolylphenol groups in the molecule is used, unexpectedly, it by itself can effectively absorb ultraviolet light having a wavelength of 400 nm (without necessity of use in combination with the ultraviolet absorber (A)) and can provide a spectacle lens having high luminous transmittance.

Therefore, according to the present invention, there is also provided a spectacle lens formed from a resin composition comprising:

(1) 100 parts by weight of a polycarbonate resin; and (2) 0.5 to 3 parts by weight of an ultraviolet absorber having an APHA value of 200 or less and a molecular weight of 500 to 2,000 and represented by the following general formula [1]:

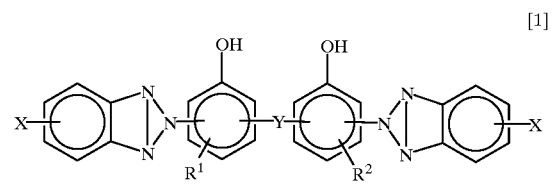

wherein X is a hydrogen atom, a halogen atom, an alkyl group, an aryl group, an aralkyl group, an alkoxy group, an aryloxy group or an aralkyloxy group, $R^1$ and $R^2$ are independently an alkyl group or aralkyl group, and Y is a divalent organic group binding two benzotriazolylphenol groups.

The spectacle lens of the present invention has a spectral transmittance for a wavelength of 400 nm of 10% or less, preferably 5% or less, when the thickness of the lens is 1.5 mm. And, the lens has a luminous transmittance of 87% or more, preferably 88% or more, when the thickness is 1.5 mm, which means that the lens has extremely high transparency. Further, the lens has a yellowness index (YI) of 0.7 to 1.8, preferably 1.2 to 1.6, when the thickness is 5.0 mm. The starting material itself of the ultraviolet absorber represented by the above general formula [1] has low yellowness index, compared with other ultraviolet absorbers for absorbing a long wavelength and hence, this composition has such an advantage that the amount of the bluing agent to be added can be reduced.

The ultraviolet absorber to be contained in the spectacle lens is a compound which has an APHA (hue) value of 200 or less and a molecular weight of 500 to 2,000 and is represented by the above general formula [1]. The term "APHA value" as used herein denotes a hue value of an absorber itself and is a hue value measured when 5 g of an ultraviolet absorber is dissolved in 100 ml of dichloromethane and the resulting solution is compared with a Harzen color number standard solution in accordance with JIS K6901 as will be described hereinafter.

When an ultraviolet absorber having an APHA (hue) value of more than 200 is used, the obtained spectacle lens has a strong yellow tint and hence, a large amount of the bluing agent is required to erase this yellow tint. When a large amount of the bluing agent is used, luminous transmittance greatly lowers with the consequence that a spectacle lens having a luminous transmittance of 87% or more cannot be obtained. An ultraviolet absorber having an APHA value of 150 or less is particularly preferred. Further, if an ultraviolet absorber represented by the above general formula [1] has a molecular weight of less than 500, it will sublime at the molding temperature or a mold temperature of the polycarbonate resin, thereby staining the mold during molding and deteriorating the outer appearance of the obtained lens. If the molecular weight is more than 2,000, the compatibility of the ultraviolet absorber with the polycarbonate resin will decrease and the haze of the lens will increase, thereby making it difficult to obtain a transparent spectacle lens. Especially, since a spectacle lens requires transparency, a material providing a haze of 2% or more is not suitable as a material for a spectacle lens.

In the general formula [1] representing the ultraviolet absorber, the halogen atom represented by X is selected from chlorine, bromine, iodine and fluorine; the alkyl group and aralkyl group are selected from alkyl and aralkyl groups having 1 to 20 carbon atoms, such as methyl, ethyl, propyl, isopropyl, butyl, secondary butyl, tertiary butyl, isobutyl, amyl, tertiary amyl, hexyl, heptyl, octyl, isooctyl, 2-ethylhexyl, 1,1,3,3-tetramethylbutyl, nonyl, decyl, isodecyl, undecyl, dodecyl, octadecyl, benzyl, α-methylbenzyl, cumyl and the like. The alkoxy group and aralkyloxy group are an alkoxy group and an aralkyloxy group derived from the above alkyl and aralkyl groups, respectively. The aryl group is selected from a phenyl group and the like. The aryloxy group is selected from a phenoxy group and the like. The alkyl group and aralkyl group represented by $R^1$ and $R^2$ are independently selected from alkyl and aralkyl groups having 1 to 20 carbon atoms, such as methyl, ethyl, propyl, isopropyl, butyl, secondary butyl, tertiary butyl, isobutyl, amyl, tertiary amyl, hexyl, heptyl, octyl, isooctyl, 2-ethylhexyl, 1,1,3,3-tetramethylbutyl, nonyl, decyl, isodecyl, undecyl, dodecyl, octadecyl, benzyl, α-methylbenzyl, cumyl and the like. Y is not particularly limited if it is a divalent organic group capable of coupling two benzotriazolylphenol groups but is preferably a divalent organic group represented by the following formula:

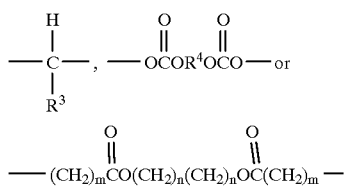

wherein $R^3$ is a hydrogen atom or alkyl group, $R^4$ is an alkylene group or allylene group, and n and m are each an integer of 1 to 5. The alkyl group represented by $R^3$ in the above formula is exemplified by an alkyl group having 1 to 20 carbon atoms, such as methyl, ethyl, propyl, isopropyl, butyl, secondary butyl, tertiary butyl, isobutyl, amyl, tertiary amyl, hexyl, heptyl, octyl, isooctyl, 2-ethylhexyl, tertiary octyl, nonyl, tertiary nonyl, decyl, undecyl and the like. The alkylene group and allylene group represented by $R^4$ are an alkylene group having 1 to 12 carbon atoms and an allylene group having 6 to 30 carbon atoms, respectively.

In the above general formula [1], the compound is preferably a compound in which X is a hydrogen atom, chlorine atom or methyl group, $R^1$ and $R^2$ are independently a hydrogen atom, alkyl group having 1 to 10 carbon atoms, cyclohexyl group, aralkyl group having 7 to 9 carbon atoms, phenyl group or naphthyl group, and

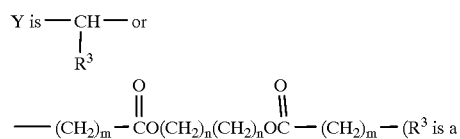

hydrogen atom or alkyl group having 1 to 4 carbon atoms, m is 2, and n is 3). The particularly preferable compound is a compound in which X is a hydrogen atom, $R^1$ and $R^2$ are independently a hydrogen atom, alkyl group having 1 to 9 carbon atoms or aralkyl group having 7 to 9 carbon atoms, and

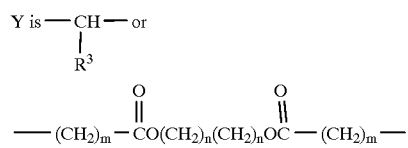

($R^3$ is a hydrogen atom, m is 2, and n is 3).

Typical examples of the compound represented by the general formula [1] are represented by the following formula.

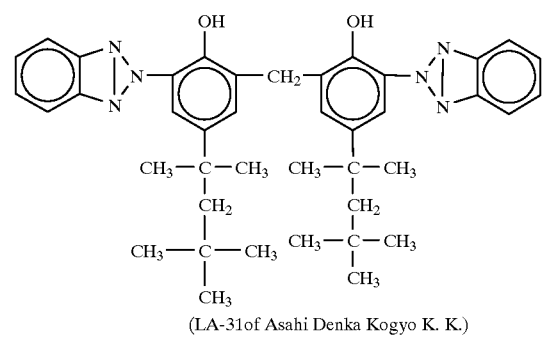

(LA-31 of Asahi Denka Kogyo K. K.)

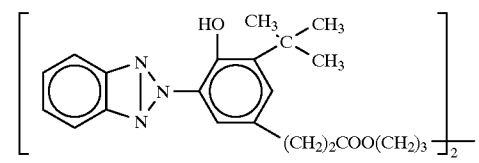

(Tinuvin 840 of Ciba-Geigy (Japan) Ltd.)

An ultraviolet absorber represented by the above general formula [1] is contained in an amount of 0.5 to 3 parts by weight based on 100 parts by weight of a polycarbonate resin. When the amount is less than 0.5 part by weight, transmittance of ultraviolet light having a wavelength of 400 nm is 10% or more and when the amount is more than 3 parts by weight, the transmittance is 1% or less. A further increase in the amount exceeding 3 parts by weight will not result in heightening of the effect. The amount is particularly preferably 0.5 to 2 parts by weight. When the ultraviolet absorber is used in an amount of 0.5 to 2 parts by weight and an ultraviolet absorber for absorbing a long wavelength is further added in an amount of 0.01 to 0.07 part by weight as the case may be, the transmittance of ultraviolet light having a wavelength of 400 nm can be reduced without greatly deteriorating the hue.

Compounds described hereinbefore are used as a polycarbonate resin into which the ultraviolet absorber represented by the above general formula [1] is added and preferred examples thereof are preferred likewise. The time and method of blending the ultraviolet absorber into the polycarbonate resin are not particularly limited, and the ultraviolet absorber is blended under the afore-mentioned conditions. A phosphorus-based stabilizer, mold-release agent and bluing agent can be added under the same conditions as described hereinbefore.

Since a spectacle lens obtained from the above-described polycarbonate resin composition of the present invention can absorb harmful ultraviolet light almost completely while retaining excellent impact resistance and transparency, and is excellent in safety, effects obtained from the spectacle lens are remarkable. Further, the spectacle lens has no problem with moldability.

EXAMPLES

The following examples are given to further illustrate the present invention. "Parts" as used in the following Examples means "parts by weight" and evaluations were carried out by the following methods.

(1) spectral transmittance: measured by using a wavelength range of 378 to 403 nm, with the CARY-5 spectrophotometer of Varian Instruments Ltd.

(2) luminous transmittance: obtained from a value of spectral transmittance for each wavelength in above (1) according to the following equation described in JIS Z-8701.

(3)

$$\text{luminous transmittance} = K \int_a^b s(\lambda) y(\lambda) \tau(\lambda) d\lambda \quad [\text{equation 1}]$$

$$K = \frac{100}{\int_a^b s(\lambda) y(\lambda) d\lambda}$$

wherein a is 380, b is 780, $s(\lambda)$ is a relative spectral distribution of standard light used for color display, $y(\lambda)$ is a color matching function, and $\tau(\lambda)$ is a spectral transmittance.

(3) yellowness index (YI): measured at a wavelength range of 380 to 780 nm using the CARY-5 spectrophotometer of Varian Instruments Ltd. in accordance with ASTM D-1925.

(4) lens hue: obtained by comparing a lens visually under a fluorescent lamp.

(5) APHA: 5 g of an ultraviolet absorber is dissolved in 100 ml of dichloromethane and APHA is measured by comparing the resulting solution with a Harzen color number standard solution based on JIS K6901.

(6) thermal stability: The hues (L, a, b) of a sample plate (70×50×2 mm) obtained by molding a pellet obtained in each Example with an injection molding machine at a cylinder temperature of 340° C. continuously and the hues (L', a', b') of a sample plate obtained by molding the pellet after the pellet is stored in a cylinder for 10 minutes are measured by a color-difference meter (supplied by Nippon Denshoku Kogyo Co., Ltd.) and a color change caused by 10 minutes of residence is represented by ΔE obtained by the following equation. A sample plate having a ΔE of 0.5 or less is evaluated as acceptable.

$$\Delta E = [(L-L')^2 + (a-a')^2 + (b-b')^2]^{1/2}$$

[Example 1]

To 100 parts of polycarbonate resin powders having a viscosity-average molecular weight of 23,700, obtained by polymerizing bisphenol A and phosgene by an interfacial polymerization method and purifying the resulting polymer in the conventional manner were added 0.33 part of 2-(2'-hydroxy-5'-tert-octylphenyl)benzotriazole (A-1) having a maximum absorption at a wavelength of 340 nm as the ultraviolet absorber (A), 0.02 part of 2-(3-tert-butyl-5-methyl-2-hydroxyphenyl)-5-chlorobenzotriazole (B-1) having a maximum absorption at a wavelength of 353 nm as the ultraviolet absorber (B), 0.25 part of stearic acid stearate, 0.03 part of trisnonylphenyl phosphite, and 0.6 ppm of a compound represented by the following formula:

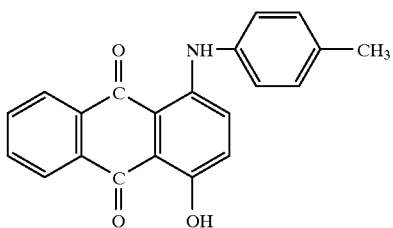

as the bluing agent. These substances were fully mixed together completely by a tumbler and the resulting mixture was formed into a pellet at 260 to 280° C. with a 30 mm vented extrusion molding machine. From the pellets were obtained a 1.5 mm-thick sample plate for the measurement of luminous transmittance and a 5.0 mm-thick sample plate for the measurement of yellowness index (YI) with an injection molding machine at a molding temperature of 300° C. The spectral transmittances for 380 nm and 400 nm, luminous transmittances and YI's of the sample plates are shown in Table 1. Further, the pellets were molded into a concave lens (spherical refracting power/cylindrical refracting power=S-3.00D/C-1.00D) with a 220-ton injection molding machine at a molding temperature of 300° C., a mold temperature of 140° C. and a molding cycle of 3 minutes. The lens had a good hue. The results are shown in Table 1.

[Example 2]

A lens having an excellent ultraviolet screening property and good hue was obtained in the same manner as in Example 1 except that the amount of 2-(2'-hydroxy-5'-tert-octylphenyl)benzotriazole (ultraviolet absorber (A)) added was changed to 0.3 part, that of 2-(3-tert-butyl-5-methyl-2-hydroxyphenyl)-5-chlorobenzotriazole (ultraviolet absorber (B)) to 0.03 part and that of the bluing agent for making uniform a blue tint to 0.7 ppm. The results are shown in Table 1.

[Example 3]

A lens having an excellent ultraviolet screening property and good hue was obtained in the same manner as in Example 1 except that the amount of 2-(2'-hydroxy-5'-tert-octylphenyl)benzotriazole (ultraviolet absorber (A)) added was changed to 0.15 part, that of 2-(3-tert-butyl-5-methyl-2-hydroxyphenyl)-5-chlorobenzotriazole (ultraviolet absorber (B)) to 0.06 part and that of the bluing agent for making uniform a blue tint to 0.8 ppm. The results are shown in Table 1.

[Example 4]

A lens having an excellent ultraviolet screening property and good hue was obtained in the same manner as in Example 1 except that the amount of 2-(2'-hydroxy-5'-tertoctylphenyl)benzotriazole (ultraviolet absorber (A)) added was changed to 0.3 part, 0.05 part of 2,2'-methylenebis[4-(1,1,3,3-tetramethylbutyl)-6-(2H-benzotriazole-2-yl)phenol] having a maximum absorption at a wavelength of 349 nm (ultraviolet absorber (B)) was used in place of 2-(3-tert-butyl-5-methyl-2-hydroxyphenyl)-5-chlorobenzotriazole, and the amount of the bluing agent for making uniform a blue tint was changed to 0.5 ppm. The results are shown in Table 1.

[Example 5]

A lens having an excellent ultraviolet screening property and good hue was obtained in the same manner as in Example 4 except that the amount of 2-(2'-hydroxy-5'-tert-octylphenyl)benzotriazole (ultraviolet absorber (A)) added was changed to 0.25 part, that of 2,2'-methylenebis[4-(1,1,3,3-tetramethylbutyl)-6-(2H-benzotriazole-2-yl)phenol] (ultraviolet absorber (B); B-2) to 0.08 part, and that of the bluing agent for making uniform a blue tint to 0.5 ppm. The results are shown in Table 1.

[Example 6]

A lens having an excellent ultraviolet screening property and good hue was obtained in the same manner as in Example 1 except that the amount of 2-(2'-hydroxy-5'-tert-octylphenyl)benzotriazole (ultraviolet absorber (A)) added was changed to 0.25 part, 0.1 part of 2-(3-tert-butyl-5-methyl-2-hydroxyphenyl)-5-chlorobenzotriazole and 0.05 part of 2,2'-methylenebis[4-(1,1,3,3-tetramethylbutyl)-6-(2H-benzotriazole-2-yl)phenol] were used as the ultraviolet absorber (B), and the amount of the bluing agent for making uniform a blue tint was changed to 0.7 ppm. The spectral transmittances of 380 nm and 400 nm, luminous transmittance, YI and hue of the lens are shown in Table 2.

[Example 7]

A lens having an excellent ultraviolet screening property and good hue was obtained in the same manner as in Example 6 except that the amount of 2-(2'-hydroxy-5'-tert-octylphenyl)benzotriazole (ultraviolet absorber (A)) added was changed to 0.2 part and that of 2,2'-methylenebis[4-(1,1,3,3-tetramethylbutyl)-6-(2H-benzotriazole-2-yl)phenol] (ultraviolet absorber (B)) to 0.1 part. The results are shown in Table 2.

[Example 8]

A lens having an excellent ultraviolet screening property and good hue was obtained in the same manner as in Example 6 except that the amount of 2-(2'-hydroxy-5'-tert-octylphenyl)benzotriazole (ultraviolet absorber (A)) added was changed to 0.2 part, that of 2,2'-methylenebis[4-(1,1,3,3-tetramethylbutyl)-6-(2H-benzotriazole-2-yl)phenol] (ultraviolet absorber (B)) to 0.15 part, and that of the bluing agent for making uniform a blue tint to 1 ppm. The results are shown in Table 2.

[Example 9]

A lens having an excellent ultraviolet screening property and good hue was obtained in the same manner as in Example 6 except that the amount of 2-(2'-hydroxy-5'-tert-octylphenyl)benzotriazole (ultraviolet absorber (A)) added was changed to 0.2 part, that of 2-(3-tert-butyl-5-methyl-2-hydroxyphenyl)-5-chlorobenzotriazole (ultraviolet absorber (B)) to 0.07 part, that of 2,2'-methylenebis[4-(1,1,3,3-tetramethylbutyl)-6-(2H-benzotriazole-2-yl)phenol] (ultraviolet absorber (B)) to 0.15 part, and that of the bluing agent for making uniform a blue tint to 0.8 ppm. The results are shown in Table 2.

[Example 10]

A lens having an excellent ultraviolet screening property and good hue was obtained in the same manner as in Example 6 except that the amount of 2-(3-tert-butyl-5-methyl-2-hydroxyphenyl)-5-chlorobenzotriazole (ultraviolet absorber (B)) added was changed to 0.05 part, that of 2,2'-methylenebis[4-(1,1,3,3-tetramethylbutyl)-6-(2H-benzotriazole-2-yl)phenol] (ultraviolet absorber (B)) to 0.1 part, and that of the bluing agent for making uniform a blue tint to 0.7 ppm. The results are shown in Table 2.

[Comparative Example 1]

A lens was obtained in the same manner as in Example 1 except that only 2-(2'-hydroxy-5'-tert-octylphenyl)benzotriazole (ultraviolet absorber (A)) was used in an amount of 0.33 part, but 2-(3-tert-butyl-5-methyl-2-hydroxyphenyl)-5-chlorobenzotriazole (ultraviolet absorber (B)) was not used. The results are shown in Table 1. Although the lens had a good hue, it could not sufficiently absorb wavelengths of 380 nm and 400 nm.

[Comparative Example 2]

A lens was obtained in the same manner as in Example 1 except that only 2-(3-tert-butyl-5-methyl-2-hydroxyphenyl)-5-chlorobenzotriazole (ultraviolet absorber (B)) was used in an amount of 0.02 part, but 2-(2'-hydroxy-5'-tert-octylphenyl)benzotriazole (ultraviolet absorber (A)) was not used. Although the lens had a good hue, it could not sufficiently absorb wavelengths of 380 nm and 400 nm.

[Comparative Example 3]

A lens was obtained in the same manner as in Example 1 except that only 2-(3-tert-butyl-5-methyl-2-hydroxyphenyl)-5-chlorobenzotriazole (ultraviolet absorber (B)) was used in an amount of 0.15 part and the amount of the bluing agent for making uniform a blue tint was changed to 1.1 ppm, but 2-(2'-hydroxy-5'-tert-octylphenyl)benzotriazole (ultraviolet absorber (A)) was not used. The results are shown in Table 1. The hue of the lens was dark blue and a difference was seen in the hue between central and peripheral portions of the lens.

[Comparative Example 4]

A lens was obtained in the same manner as in Example 6 except that only 2-(2'-hydroxy-5'-tert-octylphenyl)benzotriazole (ultraviolet absorber (A)) was used in an amount of 0.25 part, but 2-(3-tert-butyl-5-methyl-2-hydroxyphenyl)-5-chlorobenzotriazole and 2,2'-methylenebis[4-(1,1,3,3-tetramethylbutyl)-6-(2H-benzotriazole-2-yl)phenol] (ultraviolet absorber (B)) were not used. Although the lens had a good hue, it could not sufficiently absorb wavelengths of 380 nm and 400 nm.

[Comparative Example 5]

A lens was obtained in the same manner as in Example 10 except that 0.05 part of 2-(3-tert-butyl-5-methyl-2-hydroxyphenyl)-5-chlorobenzotriazole and 0.1 part of 2,2'-methylenebis[4-(1,1,3,3-tetramethylbutyl)-6-(2H-benzotriazole-2-yl)phenol] were used as the ultraviolet absorber (B), but 2-(2'-hydroxy-5'-tert-octylphenyl)

benzotriazole (ultraviolet absorber (A)) was not used. Although the lens had a good hue, it could not sufficiently absorb wavelength of 380 nm.

TABLE 1

| | Ultraviolet absorber (A) | | Ultraviolet absorber (B) | | | Amount of bluing agent (ppm) |
|---|---|---|---|---|---|---|
| | Type | Amount (parts) | Type | Amount (parts) | R | |
| Ex. 1 | A-1 | 0.33 | B-1 | 0.02 | 0.06 | 0.6 |
| Ex. 2 | A-1 | 0.3 | B-1 | 0.03 | 0.1 | 0.7 |
| Ex. 3 | A-1 | 0.15 | B-1 | 0.06 | 0.4 | 0.8 |
| Ex. 4 | A-1 | 0.3 | B-2 | 0.05 | 0.17 | 0.5 |
| Ex. 5 | A-1 | 0.25 | B-2 | 0.08 | 0.32 | 0.5 |
| Comp. Ex. 1 | A-1 | 0.33 | — | — | — | 0.6 |
| Comp. Ex. 2 | — | — | B-1 | 0.02 | — | 0.6 |
| Comp. Ex. 3 | — | — | B-1 | 0.15 | — | 1.1 |

| | Spectral transmittance for 380 nm (%) | Spectral transmittance for 400 nm (%) | Luminous transmittance (%) | YI | Lens hue |
|---|---|---|---|---|---|
| Ex. 1 | 0.001 | 70 | 90 | 1.5 | good |
| Ex. 2 | 0.002 | 65 | 89 | 1.6 | good |
| Ex. 3 | 0.003 | 60 | 88 | 1.8 | good |
| Ex. 4 | 0.002 | 65 | 90 | 1.4 | good |
| Ex. 5 | 0.003 | 60 | 89 | 1.6 | good |
| Comp. Ex. 1 | 0.03 | 80 | 90 | 1.0 | good |
| Comp. Ex. 2 | 0.7 | 85 | 90 | 0.8 | good |
| Comp. Ex. 3 | 0.001 | 10 | 86 | 1.9 | hazy |

Ex.: Example
Comp. Ex.: Comparative Example

TABLE 2

| | Ultraviolet absorber (A) | | Ultraviolet absorber (B) | | | Amount of bluing agent (ppm) |
|---|---|---|---|---|---|---|
| | Type | Amount (parts) | Type | Amount (parts) | R | |
| Ex. 6 | A-1 | 0.25 | B-1 | 0.1 | 0.6 | 0.7 |
| | | | B-2 | 0.05 | | |
| Ex. 7 | A-1 | 0.2 | B-1 | 0.1 | 1 | 0.7 |
| | | | B-2 | 0.1 | | |
| Ex. 8 | A-1 | 0.2 | B-1 | 0.1 | 1.25 | 1 |
| | | | B-2 | 0.15 | | |
| Ex. 9 | A-1 | 0.2 | B-1 | 0.07 | 1.1 | 0.8 |
| | | | B-2 | 0.15 | | |
| Ex. 10 | A-1 | 0.25 | B-1 | 0.05 | 0.6 | 0.7 |
| | | | B-2 | 0.1 | | |
| Comp. Ex. 4 | A-1 | 0.25 | — | — | — | 0.7 |
| Comp. Ex. 5 | — | — | B-1 | 0.05 | — | 0.7 |
| | | | B-2 | 0.1 | | |

| | Spectral transmittance for 380 nm (%) | Spectral transmittance for 400 nm (%) | Luminous transmittance (%) | YI | Lens hue |
|---|---|---|---|---|---|
| Ex. 6 | 0.001 | 10 | 88 | 1.5 | good |
| Ex. 7 | 0.001 | 8 | 87 | 1.8 | good |
| Ex. 8 | 0.001 | 6 | 87 | 1.6 | good |
| Ex. 9 | 0.001 | 9 | 88 | 1.5 | good |
| Ex. 10 | 0.001 | 10 | 88 | 1.5 | good |
| Comp. Ex. 4 | 0.04 | 85 | 90 | 0.6 | good |
| Comp. Ex. 5 | 0.01 | 60 | 88 | 1.4 | good |

Ex.: Example
Comp. Ex.: Comparative Example

[Example 11]

To 100 parts of polycarbonate resin powders having a viscosity-average molecular weight of 23,700 obtained by polymerizing bisphenol A and phosgene by an interfacial polymerization method and purifying the resulting polymer were added 0.25 part of 2-(2'-hydroxy-5'-tert-octylphenyl) benzotriazole as the ultraviolet absorber (A), 0.08 part of 2,2'-methylenebis[4-(1,1,3,3-tetramethylbutyl)-6-(2H-benzotriazole-2-yl)phenol] as the ultraviolet absorber (B), 0.02 part of tetrakis(2,4-di-tert-butylphenyl)-4,4'-biphenylene phosphonite (compound C), 0.2 part of monoglyceride stearate and 0.5 ppm of a compound represented by the following formula:

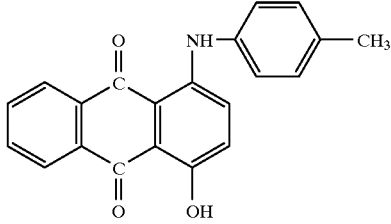

as the bluing agent. These substances were fully mixed together by a tumbler and the resulting mixture was formed into a pellet at 260 to 280° C. with a 30 mm vented extrusion molding machine. The spectral transmittance for a wavelength of 380 nm and 400 nm, luminous transmittance, YI and ΔE of this pellet are shown in Table 3. The pellets were molded into a concave lens (S-3.00D/C-1.00D) by a 220-ton injection molding machine at a cylinder temperature of 300° C., a mold temperature of 140° C. and a molding cycle of 3 minutes. The lens had a good hue. The results are shown in Table 3.

[Example 12]

A lens having an excellent ultraviolet screening property, high heat resistance and a good hue was obtained in the same manner as in Example 11 except that 0.03 part of tris-nonylphenyl phosphate (compound D) was newly added as a phosphite-based compound. The results are shown in Table 3.

TABLE 3

| | Ultraviolet absorber (A) | | Ultraviolet absorber (B) | | | Compound C | Compound D | Amount of bluing agent |
|---|---|---|---|---|---|---|---|---|
| | Type | Amount (parts) | Type | Amount (parts) | R | (parts) | (parts) | (ppm) |
| Ex. 11 | A-1 | 0.25 | B-2 | 0.08 | 0.32 | 0.02 | — | 0.5 |
| Ex. 12 | A-1 | 0.25 | B-2 | 0.08 | 0.32 | 0.02 | 0.03 | 0.5 |

| | Spectral transmittance for 380 nm (%) | Spectral transmittance for 400 nm (%) | Luminous transmittance (%) | YI | Lens hue | ΔE |
|---|---|---|---|---|---|---|
| Ex. 11 | 0.003 | 60 | 89 | 1.6 | good | 0.4 |
| Ex. 12 | 0.003 | 60 | 89 | 1.6 | good | 0.2 |

Ex.: Example

[Example 13]

To 100 parts of polycarbonate resin powders having a viscosity-average molecular weight of 23,700 obtained by polymerizing bisphenol A and phosgene by an interfacial polymerization method and purifying the resulting polymer were added 0.5 part of 2,2'-methylenebis[4-(1,1,3,3-tetramethylbutyl)-6-(2H-benzotriazole-2-yl)phenol] (molecular weight of 659, melting point of 195° C., APHA of 150) as the ultraviolet absorber, 0.25 part of stearic acid stearate, 0.03 part of trisnonylphenyl phosphite and 0.5 ppm of a compound represented by the following formula:

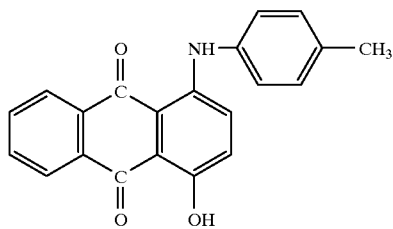

as the bluing agent. These substances were fully mixed together by a tumbler and the resulting mixture was formed into a pellet at 260 to 280° C. with a 30 mm vented extrusion molding machine. The spectral transmittance for a wavelength of each of 380 nm and 400 nm, luminous transmittance and YI of this pellet are shown in Table 4. The pellets were molded into a concave lens (spherical refracting power/cylindrical refracting power=S-3.00D/C-1.00D)) by a 220-ton injection molding machine at a cylinder temperature of 300° C., a mold temperature of 140° C. and a molding cycle of 3 minutes. The lens had a good hue. The results are shown in Table 4.

[Example 14]

A lens having an excellent ultraviolet screening property and a good hue was obtained in the same manner as in Example 13 except that the amount of the ultraviolet absorber used was changed to 1 part and that of the bluing agent for making uniform a blue tint to 0.7 ppm. The results are shown in Table 4.

[Example 15]

A lens having an excellent ultraviolet screening property and a good hue was obtained in the same manner as in Example 13 except that the amount of the ultraviolet absorber used was changed to 2 parts and that of the bluing agent for making uniform a blue tint to 0.8 ppm. The results are shown in Table 4.

[Example 16]

A lens having an excellent ultraviolet screening property and a good hue was obtained in the same manner as in Example 13 except that 1 part of hexane-1,6-diylbis[3-(3-benzotriazole-2-yl-5-tert-butyl-4-hydroxyphenyl) propionate](B-3)(molecular weight of 761, melting point of 118 to 120° C., APHA of 150) was used in place of the ultraviolet absorber used in Example 13 and the amount of the bluing agent for making uniform a blue tint was changed to 0.8 ppm. The results are shown in Table 4.

[Example 17]

A lens having an excellent ultraviolet screening property and a good hue was obtained in the same manner as in Example 13 except that the amount of the ultraviolet absorber used was changed to 1 part, 0.02 part of 2-(3-tert-butyl-5-methyl-2-hydroxyphenyl)-5-chlorobenzotriazole (molecular weight of 316, melting point of 138 to 141° C., APHA of 300) was further used as an additional ultraviolet absorber, and the amount of the bluing agent for making uniform a blue tint was changed to 1 ppm. The results are shown in Table 4.

TABLE 4

|  | Ultraviolet absorber | | Amount of bluing agent (ppm) | Spectral transmittance for 380 nm (%) | Spectral transmittance for 400 nm (%) | Luminous transmittance (%) | Y1 | Lens hue |
|---|---|---|---|---|---|---|---|---|
|  | Type | Amount (parts) | | | | | | |
| Ex. 13 | B-2 | 0.5 | 0.5 | 0.001 | 8 | 90 | 1.6 | good |
| Ex. 14 | B-2 | 1.0 | 0.7 | 0.001 | 3 | 90 | 1.6 | good |
| Ex. 15 | B-2 | 2.0 | 0.8 | 0.001 | ≦1 | 89 | 1.6 | good |
| Ex. 16 | B-3 | 1.0 | 0.8 | 0.001 | 4 | 90 | 1.5 | good |
| Ex. 17 | B-2 | 1.0 | 1.0 | 0.001 | 2 | 89 | 1.6 | good |
|  | B-1 | 0.02 | | | | | | |

Ex.: Example

What is claimed is:

1. A spectacle lens which is formed from a resin composition consisting essentially of
   (1) 100 parts by weight of polycarbonate resin;
   (2) 0.05 to 0.5 part by weight of ultraviolet absorber (A) having a maximum absorption in a wavelength of 300 to 345 nm when measured in a chloroform solution; and
   (3) 0.01 to 0.3 part by weight of ultraviolet absorber (B) having a maximum absorption in a wavelength of 346 to 400 nm when measure in a chloroform solution,
   said resin composition characterized by having, when formed into a lens having a thickness of 1.5 mm, a spectral transmittance for a wavelength of 380 nm of 0.005% or less and a spectral transmittance for a wavelength of 400 nm of 70% or less.

2. The spectacle lens of claim 1, wherein the weight ratio, (B)/(A), of ultraviolet absorber (B) to the ultraviolet absorber (A) is in the range of 0.05 to 4.

3. The spectacle lens of claim 1 which has a luminous transmittance of 87% or more when the thickness of the lens is 1.5 mm.

4. The spectacle lens of claim 1 which has a yellowness index (YI) of 0.7 to 1.8 when the thickness of the lens is 5.0 mm.

5. The spectacle lens of claim 1, wherein ultraviolet absorber (A) is at least one compound selected from the group consisting of 2-hydroxy-4-methoxybenzophenone, 2-hydroxy-4-n-octoxybenzophenone, 2-hydroxy-4-methoxy-2'-carboxybenzophenone, 2,4-dihydroxybenzophenone, 2-(2'-hydroxy-5'-methylphenyl)benzotriazole, 2-[2-hydroxy-3-(3,4,5,6-tetrahydrophthalimidemethyl)-5-methylphenyl]benzotriazole, 2-(2-hydroxy-3,5-di-tert-butylphenyl)benzotriazole and 2-(2'hydroxy-5'-tert-octylphenyl)benzotriazole.

6. The spectacle lens of claim 1, wherein ultraviolet absorber (A) is at least one compound selected from the group consisting of 2-(2'-hydroxy-5'-methylphenyl)benzotriazole and 2-(2'hydroxy-5'-tert-octylphenyl)benzotriazole.

7. The spectacle lens of claim 1, wherein ultraviolet absorber (B) is at least one compound selected from the group consisting of 2,2'-dihydroxy-4-methoxybenzophenone, 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2,2'-methylenebis[4-(1,1,3,3-tetramethylbutyl)-6-(2H-benzotriazole-2-yl)phenol, 2-[2-hydroxy-3,5-bis(α,α-dimethylbenzyl)phenyl]-2H-benzotriazole and 2-(3,5-di-tert-amyl-2-hydroxyphenyl)benzotriazole.

8. The spectacle lens of claim 1, wherein ultraviolet absorber (B) is at least one compound selected from the group consisting of 2-(3-tert-butyl-5-methyl-2-hydroxyphenyl)-5-chlorobenzotriazole, 2,2'-methylenebis[4-(1,1,3,3-tetramethylbutyl)-6-(2H-benzotriazole-2-yl)phenol] and 2-[2-hydroxy-3,5-bis(α,α-dimethylbenzyl)phenyl]-2H-benzotriazole.

9. The spectacle lens of claim 1, wherein polycarbonate resin comprises 2,2-bis(4-hydroxyphenyl)propane as a main divalent phenol component.

10. A spectacle lens which is formed from a resin composition consisting essentially of
    (1) 100 parts by weight of polycarbonate resin;
    (2) 0.05 to 0.5 part by weight of ultraviolet absorber (A) having a maximum absorption in a wavelength of 300 to 345 nm when measured in a chloroform solution; and
    (3) 0.01 to 0.3 part by weight of ultraviolet absorber (B) having a maximum absorption in a wavelength of 346 to 400 nm when measure in a chloroform solution,
    said resin composition characterized by having, when formed into a lens having a thickness of 1.5 mm, a spectral transmittance for a wavelength of 380 nm of 0.005% or less and a spectral transmittance for a wavelength of 400 nm of 10% or less.

11. The spectacle lens of claim 10, wherein the weight of ratio of ultraviolet absorber (B) to ultraviolet absorber (A) is in the range of 0.05 to 4 in terms of (B)/(A) weight ratio.

12. The spectacle lens of claim 10 which has a luminous transmittance of 87% or more when the thickness of the lens is 1.5 mm.

13. The spectacle lens of claim 10 which has a yellowness index (YI) of 0.7 to 1.8 when the thickness of the lens is 5.0 mm.

14. The spectacle lens of claim 10, wherein ultraviolet absorber (A) is at least one compound selected from the group consisting of 2-hydroxy-4-methoxybenzophenone, 2-hydroxy-4-n-octoxybenzophenone, 2-hydroxy-4-methoxy-2'-carboxybenzophenone, 2,4-dihydroxybenzophenone, 2-(2'-hydroxy-5'-methylphenyl)benzotriazole, 2-[2-hydroxy-3-(3,4,5,6-tetrahydrophthalimidemethyl)-5-methylphenyl]benzotriazole, 2-(2-hydroxy-3,5-di-tert-butylphenyl)benzotriazole and 2-(2'hydroxy-5'-tert-octylphenyl)benzotriazole.

15. The spectacle lens of claim 10, wherein ultraviolet absorber (A) is at least one compound selected from the group consisting of 2-(2'-hydroxyl-5'-methylphenyl)benzotriazole and 2-(2'-hydroxy-5'-tert-octylphenyl)benzotriazole.

16. The spectacle lens of claim 10, wherein ultraviolet absorber (B) is at least one compound selected from the group consisting of 2,2'-dihydroxy-4-methoxybenzophenone, 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2,2'-methylenebis[4-(1,1,3,3-tetramethylbutyl)-6-(2H-benzotriazole-2-yl)phenol, 2-[2-hydroxy-3,5-bis(α,α-dimethylbenzyl)phenyl]-2H-benzotriazole and 2-(3,5-di-tert-amyl-2-hydroxyphenyl)benzotriazole.

17. The spectacle lens of claim 10, wherein ultraviolet absorber (B) is at least one compound selected from the group consisting of 2-(3-tert-butyl-5-methyl-2-hydroxyphenyl)-5-chlorobenzotriazole, 2,2'-methylenebis[4-(1,1,3,3-tetramethylbutyl)-6-(2H-benzotriazole-2-yl)phenol] and 2-[2-hydroxy-3,5-bis(α,α-dimethylbenzyl)phenyl]-2H-benzotriazole.

18. The spectacle lens of claim 10, wherein polycarbonate resin comprises 2,2-bis(4-hydroxyphenyl)propane as a main divalent phenol component.

19. A spectacle lens which is formed from a resin composition consisting essentially of
  (1) 100 parts by weight of polycarbonate resin; and
  (2) 0.5 to 3 parts by weight of ultraviolet absorber having an APHA value of 200 or less and a molecular weight of 500 to 2,000 and represented by the following general formula (1):

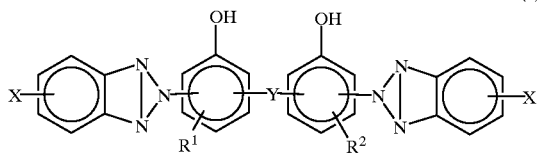

(1)

wherein X is a hydrogen atom, halogen atom, alkyl group, aryl group, aralkyl group, alkoxy group, aryloxy group or aralkyloxy group, R1 and R2 are independently an alkyl group or aralkyl group, and Y is a divalent organic group for coupling two benzotriazolylphenol groups,
  said resin composition characterized by having, when formed into a lens having a thickness of 1.5 mm, a spectral transmittance for a wavelength of 380 nm of 0.005% or less and a spectral transmittance for a wavelength of 400 nm of 10% or less.

20. The spectacle lens of claim 19, which has a luminous transmittance of 87% or more when the thickness of the lens is 1.5 mm.

21. The spectacle lens of claim 19 which has a yellowness index (YI) of 0.7 to 1.8 when the thickness of the lens is 5.0 mm.

22. The spectacle lens of claim 19, wherein ultraviolet absorber represented by the above general formula (1) is at least one compound selected from the group consisting of 2,2'-methylenebis[4-(1,1,3,3-tetramethylbutyl)-6-(2H-benzotriazole-2-yl)phenol] and hexane-1,6-diylbis[3-(3-benzotriazole-2-yl-5-tert-butyl-4-hydroxyphenyl)propionate].

23. The spectacle lens of claim 19, wherein polycarbonate resin comprises 2,2-bis(4-hydroxyphenyl)propane as a main divalent phenol component.

24. The spectacle lens of claim 1 wherein ultraviolet absorber (A) is present in an amount of 0.1 to 0.5 part by weight and ultraviolet absorber (B) is present in an amount of 0.01 to 0.1.

25. The spectacle lens of claim 24, wherein the weight ratio, (B)/(A), of ultraviolet absorber (B) to the ultraviolet absorber (A) is in the range of 0.05 to 0.5.

26. The spectacle lens of claim 1 wherein the resin composition further includes at least one of mold-release agent, phosphorus acid ester-based thermal stabilizer, and bluing agent.

27. The spectacle lens of claim 26 wherein the resin composition further includes
  (4) 0.03 to 1 part by weight of mold-release agent;
  (5) 0.001 to 0.1 part by weight of thermal stabilizers; and
  (6) 0.3 to 1.2 parts, per million parts of polycarbonate resin, of bluing agent.

28. The spectacle lens of claim 1 which has a yellowness index (YI) of 1 to 1.6 when the thickness of the lens is 5.0 mm.

29. The spectacle lens of claim 1 wherein ultraviolet absorber (A) is at least one compound selected from the group consisting of 2-(2'-hydroxy-5'-methylphenyl)benzotriazole and 2-(2'hydroxy-5'-tert-octylphenyl)benzotriazole and ultraviolet absorber (B) is at least one compound selected from the group consisting of 2-(3-tert-butyl-5-methyl-2-hydroxphenyl)-5-chlorobenzotriazole, 2,2'-methylenebis[4-(1,1,3,3-tetramethylbutyl)-6-(2H-benzotriazole-2-yl)phenol] and 2-[2-hydroxy-3,5-bis(α,α-dimethylbenzyl)phenyl]-2H-benzotriazole.

30. The spectacle lens of claim 10 wherein ultraviolet absorber (B) is present in an amount of 0.05 to 0.3 part by weight and wherein the weight ratio of ultraviolet absorber (B) to ultraviolet absorber (A) is in the range of 0.5 to 4.

31. The spectacle lens of claim 30 which further includes at least one of mold-release agent, phosphorus acid ester-based thermal stabilizer, and bluing agent.

32. The spectacle lens of claim 31 wherein the resin composition further includes
  (4) 0.03 to 1 part by weight of mold-release agent;
  (5) 0.001 to 0.1 part by weight of thermal stabilizers; and
  (6) 0.3 to 1.2 parts, per million parts of polycarbonate resin, of bluing agent.

33. The spectacle lens of claim 10 wherein ultraviolet absorber (A) is at least one compound selected from the group consisting of 2-(2'-hydroxyl-5'-methylphenyl)benzotriazole and 2-(2'-hydroxy-5'-tert-octylphenyl)benzotriazole and ultraviolet absorber (B) is at least one compound selected from the group consisting of 2-(3-tert-butyl-5-methyl-2-hydroxyphenyl)-5-chlorobenzotriazole, 2,2'-methylenebis[4-(1,1,3,3-tetramethylbutyl)-6-(2H-benzotriazole-2-yl)phenol] and 2-[2-hydroxy-3,5-bis(α,α-dimethylbenzyl)phenyl]-2H-benzotriazole.

34. The spectacle lens of claim 19 wherein in formula (1) X is a hydrogen atom, chlorine atom or methyl group; $R^1$ and $R^2$ are, independently, a hydrogen atom, alkyl group having 1 to 10 carbon atoms, cyclohexyl group, aralkyl group having 7 to 9 carbon atoms, phenyl group or naphthyl group; and Y is —CH— or carbon atoms, phenyl group or naphthyl group; and Y is —CH— or
        |
        $R^3$

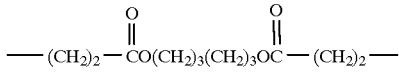

where $R^3$ represents a hydrogen atom or alkyl group having 1 to 4 carbon atoms.

35. The spectacle lens of claim 19 which further includes at least one of mold-release agent, phosphorus acid ester-based thermal stabilizer, and bluing agent.

36. The spectacle lens of claim 35 wherein the resin composition further includes (4) 0.03 to 1 part by weight of mold-release agent;

(5) 0.001 to 0.1 part by weight of thermal stabilizers; and (6) 0.3 to 1.2 parts, per million parts of polycarbonate resin, of bluing agent.

* * * * *